Figure 1:
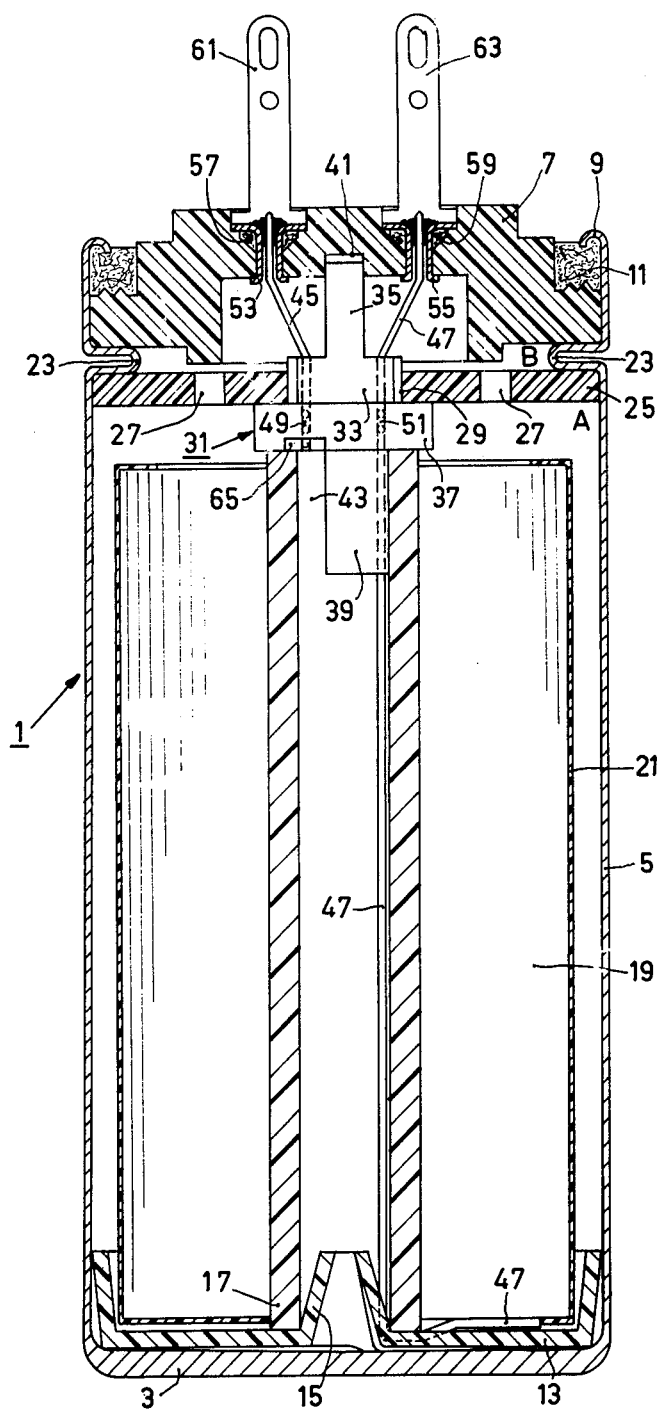

United States Patent [19]

Koel et al.

[11] 4,059,848

[45] Nov. 22, 1977

[54] WOUND CAPACITOR COMPRISING AN EXCESS-PRESSURE SAFETY DEVICE

[75] Inventors: Maarten Koel; Hubertus J. Theelen, both of Eindhoven, Netherlands

[73] Assignee: U.S. Philips Corporation, New York, N.Y.

[21] Appl. No.: 711,711

[22] Filed: Aug. 5, 1976

[30] Foreign Application Priority Data

Aug. 8, 1975 Netherlands .......................... 7509465

[51] Int. Cl.² .............................................. H01G 1/11
[52] U.S. Cl. .................................... 361/272; 361/274; 361/275
[58] Field of Search ............... 317/247, 260, 256, 242; 361/271, 272, 274, 275

[56] References Cited

U.S. PATENT DOCUMENTS 3,697,824 10/1972 Greskamp ............................ 317/260

FOREIGN PATENT DOCUMENTS 1,335,981 10/1973 United Kingdom ................. 317/247
1,388,052 3/1975 United Kingdom ................. 317/247

*Primary Examiner*—E. A. Goldberg
*Attorney, Agent, or Firm*—Frank R. Trifari; Daniel R. McGlynn

[57] ABSTRACT

A wound capacitor comprising a cylindrical housing which includes an expansion space which is closed on the one side by a lid and which is bounded on the other side by a rigidly arranged centering disc which is provided with openings. Through such openings the expansion space is in open communication with a space in which a capacitor roll, disposed on a cylindrical core, is arranged. Connection wires are connected to the electrodes in the capacitor roll. These wires are anchored in the lid as well as in a centering member arranged in the centering disc. The centering member is locked against axial displacement by way of a shoulder which bears against the centering disc. In the case of an inadmissibly high gas pressure in the capacitor, the lid is displaced relative to the centering member and the connection wires are broken, the capacitor thus being rendered explosion-proof.

4 Claims, 3 Drawing Figures

WOUND CAPACITOR COMPRISING AN EXCESS-PRESSURE SAFETY DEVICE

The invention relates to a wound capacitor comprising a cylindrical housing which is closed by a lid and which accommodates a capacitor roll arranged on a cylindrical core and also a centering disc which bears against a ridge formed in the wall of the housing and which is rigidly arranged between the lid and the capacitor roll, and at least one connection which is electrically connected to a capacitor electrode and which is anchored in the lid as well as in a centering member provided in the centering disc, the housing being provided with an expansion ridge which is situated between the lid and the centering disc.

In a known wound capacitor of the kind set forth (German Gebrauchmuster No. 1,794,821), the centering member consists of a metal bush which projects into the hollow core of the capacitor roll and which is riveted to the centering disc of insulating material. The electrical connection is secured in an opening in the bottom of the bush.

The known wound capacitor has a drawback in that a riveted joint is required for securing the bush in the centering disc, it being possible to form a riveting collar only on the side of the bush which faces the lid. A riveted joint of this kind does not provide a reliable connection in all circumstances. Moreover, an operation is required which cannot be simply performed. A further drawback exists in that, in the increasingly larger number of cases where it is prescribed that no electrical voltage should be present across the housing when excess pressure occurs in capacitors comprising a metal housing, this requirement cannot be satisfied by anchoring also the second connection in the said bush. The replacement of the metal bush by a bush of insulating material would only increase the problems as regards the realization of a reliable riveted joint.

The invention has for its object to provide a wound capacitor comprising an excess-pressure safety device which does not require complex operations and which is suitable for constructions where both connections must be simultaneously broken.

To this end, a wound capacitor in accordance with the invention is characterized in that the centering member consists of a loose insert of electrically insulating material which comprises a shoulder which is locked against axial displacement relative to the housing between an end of the core and the side of the centering disc which faces the capacitor roll.

Figure 2:
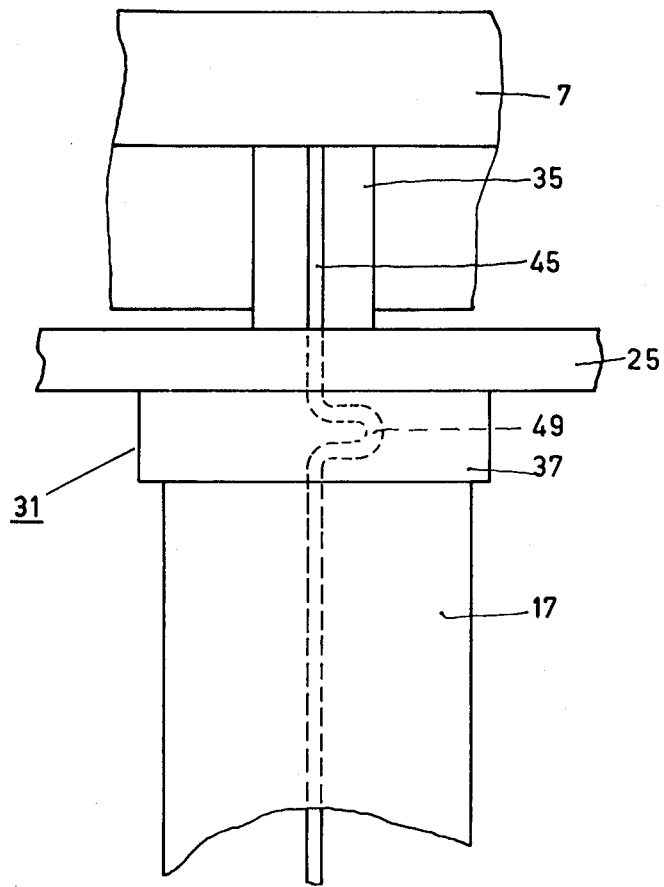
Figure 3:
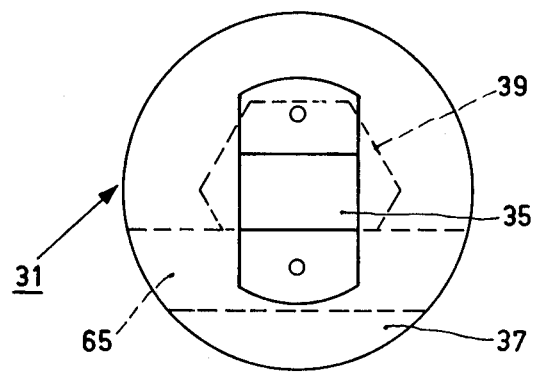

An embodiment of the invention will now be described in detail, by way of example, with reference to the accompanying drawings, of which:

FIG. 1 is a longitudinal sectional view of a preferred embodiment of a wound capacitor in accordance with the invention, FIG. 2 is a side elevation of the centering member shown in FIG. 1, and FIG. 3 is a plan view of the centering member shown in FIG. 1.

The wound capacitor shown in FIG. 1 comprises a cylindrical housing 1 of aluminium which is closed on the lower side (in the drawing) by a bottom portion 3 which is integral with a wall portion 5. The housing 1 is closed on the upper side by a disc-like lid 7 of hard plastic. The lid 7 is retained in the housing by way of a cromped end edge 9. The edge 9 is crimped after the space between the lid and the housing has been sealed by means of a rubber ring 11. The housing accommodates an insert 13 which comprises a conical raised portion 15 which serves for centering a hollow core 17 of synthetic material. A capacitor roll 19 is wound about the core 17 in the usual manner. The capacitor roll 19 can be composed, for example, of two-sided metallized polypropylene foil with a paper foil as the separator. The capacitor roll is enclosed along its circumference by electrically insulating material 21.

The wall 5 of the capacitor housing 1 comprises an expansion ridge 23 which supports the lid 7. A hard-paper centering disc 25 bears against the lower side of the expansion ridge 23, the said disc being provided with openings 27 so that the space denoted by the reference A in the drawing is in open communication with the space B between the lid 7 and the centering disc 25. The disc 25 comprises a central round opening 29 whose center is situated on the longitudinal axis of the capacitor. The opening 29 accommodates a portion 33, having a round section, of a centering member 31. The centering member 31 is a loose insert made of an electrically insulating material such as a thermosetting fibre-glass-reinforced synthetic material. Besides the portion 33, having a round secction, the centering member 31 comprises a downwards directed portion 39 whose section forms part of a regular hexagon (see FIG. 3). The portion 39 suitably engages a cavity 43 in the core 17. The cavity 43 has a profile shaped as a regular hexagon. A portion 35 of the centering member 31 suitably engages a recess 41 in the lid. The recess 41 has a rectangular section.

Two round connection wires 45 and 47 of tinned copper are anchored in the centering member 31. To this end, the wires 45 and 47 are provided with loop-like bends 49 and 51 (see also FIG. 2). The bends 49 and 51 can be embedded in the synthetic material of the centering member 31. However, the centring member can alternatively be composed of two parts with suitable recesses for the bends 49 and 51. After insertion of the wires 45 and 47, the two parts are positioned one against the other and are joined by ultrasonic welding. The two parts can alternatively be profiled so that the bends 49 and 51 are formed during the pressing together of the parts for the ultrasonic welding. The wires 45 and 47 are also anchored in metal eyelets 53 and 55 in the lid 7. Rubber sealing rings 57 and 59 are provided between the eyelets 53 and 55 and the lid 7. The wires are soldered to the eyelets 53 and 55, together with two external connections 61 and 63. The anchoring of the wires is symmetrical with respect to the longitudinal axis of the capacitor and with respect to the center of the centering member. The ends of the connection wires 45 and 47 which are remote from the lid 7 are electrically connected to the electrodes of the capacitor roll 19 (see wire 47). The centering member comprises a recess 65 for the lateral guiding of the connection wire 45 which is connected to the relevant capacitor electrode on upper side of the capacitor roll (not visible). The wires 45 and 47 are anchored in the centering member 31 and the lid 7 so that the force required for pulling the wires loose from the lid and the centering member amply exceeds the force at which the wires are loaded to the yield point of the copper. Instead of wires, use can alternatively be made of connections having a non-round section, for example, narrow strips. The connections may be provided or not with a weak portion which acts as a breaking point.

At a given inadmissible pressure which involves the risk of explosion of the capacitor during operation, the expansion ridge 23 ensures that the expansion space B is enlarged so that the wires 45 and 47 are loaded up to their yield point, after which the wires break and the capacitor becomes explosion-proof. A shoulder 37 of the centering member engaging on the one side the centering disc 25 and on the other side an end face of the core 17, prevents, in the case of a pressure increase in the capacitor, displacement of the centering member which might relieve the tension wires 45 and 47. The symmetrical anchoring of the wires ensures the breaking of both wires.

The rectangular profile 35, suitably engaging the opening 41 in the lid 7, prevents rotation of the capacitor roll with respect to the housing, so that the wires 45 and 47 cannot be twisted. The irregularly shaped profile 39 has a similar function to prevent the capacitor roll from rotating with respect to the centering member 31. However, if adequte contact pressure between the shoulder 37 and the core 17 is obtained by suitable proportioning, the shape of the profile 39 need not be irregular. A round profile 39 and a round cavity 43 in the core are then feasible. Proper centering is thus also ensured. Consequently, the profiles 35, 39, 41 and 43 primarily serve for the centering of the lid and the capacitor roll. Rotation of the centering member relative to the lid can also be prevented by irregularly shaping the opening 29 and the portion 33, and also by arranging the profile 35 and the recess 41 eccentrically with respect to the center of the centering member.

As a result of the fact that the centering member is a loose insert whose shoulder 37 prevents axial displacement, very simple and inexpensive manufacture of explosion-proof capacitors is achieved. The capacitor is assembled by arranging a centering member, already provided with anchored wires, in the core 17 outside the housing, and by subsequently electrically connecting the wires to the capacitor electrodes. The centering disc 25 can be arranged on the centering member by bending the wires 45 and 47 as shown in drawing only after the disc has been mounted. This can be effected inside as well as outside the housing. The assembly thus obtained is anchored in the housing by means of the expansion ridge 23. The centering member 31 then serves for centering the lid relative to the housing as well as for centering the wires 45 and 47 relative to the eyelets 53 and 55. The lid is axially anchored in the housing by cromping the edge 9.

The described protection against explosion is particularly important for wound capacitors which comprise polypropylene foil as the dielectric and which are used in alternating voltage circuits. In the case of alternating voltage loading, the polypropylene foil is decomposed, so that an inadmissibly high gas pressure may arise. Generally speaking, the described explosion protection can be used in all wound capacitors in which there is a risk of gas formation, for example, gas released by dielectric foils, envelopes, separator foils, impregnating liquids or filling agents. Capacitors comprising a dielectric in the form of a polypropylene foil are inter alia used in alternating voltage circuits such as in gas discharge tubes and starting circuits for motors.

What is claimed is:

1. A wound capacitor comprising
   a cylindrical housing having an open end and including a ridge in the wall of the housing;
   a cylindrical core and a capacitor roll arranged thereon contained in said housing;
   a lid closing said open end of the housing and including a centering member comprising a loose insert of electrically insulating material having a portion locked against axial displacement relative to said housing between an end of said core and a side of said centering disc facing said capacitor roll, said centering member having a first projection which has a shpaed cross section that engages a similarly shaped recess in said lid, and a second projection which has a shaped cross section engaging a similarly shaped recess in said capacitor core for preventing relative rotation of said centering member; and
   an electrical connection anchored in said lid and said centering disc for connection to a capacitor electrode.

2. A wound capacitor as claimed in claim 1, wherein said first projection of said centering member facing said lid has an irregularly shaped cross-section.

3. A wound capacitor as claimed in claim 1, wherein the capacitor roll is electrically connected to a second connection anchored in the lid and in the centering member, the two connections being symmetrically situated with respect to the longitudinal axis of the housing the center of the centering member.

4. A wound capacitor as claimed in claim 1, wherein the electrical connection comprises a metal wire having a round cross-section and provided with a loop-like bend anchored in the centering member.

* * * * *